(12) United States Patent
Mazur

(10) Patent No.: US 6,666,201 B1
(45) Date of Patent: Dec. 23, 2003

(54) SYSTEM AND METHOD FOR DIAGNOSING EGR PERFORMANCE USING NOX SENSOR

(75) Inventor: Christopher John Mazur, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 57 days.

(21) Appl. No.: 10/063,955

(22) Filed: May 29, 2002

(51) Int. Cl.⁷ ............................................... F02B 75/08
(52) U.S. Cl. .................... 123/698; 123/568.16; 123/690
(58) Field of Search .......................... 123/698, 568.16, 123/688, 690; 701/108

(56) References Cited

U.S. PATENT DOCUMENTS

| | | | | |
|---|---|---|---|---|
| 6,318,074 B1 | * | 11/2001 | Nishimura et al. | 60/284 |
| 6,330,796 B1 | * | 12/2001 | Nishimura et al. | 60/286 |
| 6,345,499 B1 | * | 2/2002 | Nishimura et al. | 60/277 |
| 6,502,388 B2 | * | 1/2003 | Takaku et al. | 60/285 |
| 6,615,577 B2 | * | 9/2003 | Meyer et al. | 60/276 |

* cited by examiner

Primary Examiner—John Kwon

(57) ABSTRACT

A method and system for diagnosing a condition of an EGR valve used in an engine system. The EGR valve controls the portion exhaust gases produced by such engine system and fed back to an intake of such engine system. The engine system includes a NOx sensor for measuring NOx in such exhaust. The method includes: determining a time rate of change in NOx measured by the NOx sensor; comparing the determined time rate of change in the measured NOx with a predetermined expected time rate of change in measured NOx; and determining the condition of the EGR valve as a function of such comparison. The method also includes: determining from NOx measured by the NOx sensor and engine operating conditions indications of instances when samples of such measured NOx are greater than an expected maximum NOx level for such engine condition and less than an expected minimum NOx level for such engine condition; and determining the condition of the EGR valve as a function of a statistical analysis of such indications. The method includes determining whether the NOx sensor is faulty and wherein the EGR condition determining includes determining whether the NOx sensor is faulty.

20 Claims, 4 Drawing Sheets

SYSTEM AND METHOD FOR DIAGNOSING EGR PERFORMANCE USING NOX SENSOR

This invention was made with Government support under Cooperative Agreement DE-FC26-01 NT41 103 awarded by the Department of Energy. The Government has certain rights in the invention.

CROSS REFERENCE TO RELATED APPLICATIONS

BACKGROUND OF INVENTION

1. Technical Field

This invention relates to systems and methods for diagnosing Exhaust Gas Recirculation (EGR) valve performance.

2. Background and Summary

As is known in the art, internal combustion engines and more particularly internal combustion engines used on most passenger and truck vehicles use exhaust gas recirculation (EGR) systems to reduce exhaust pollution. As is also known in the art, diesel engines-typically incorporate EGR to reduce combustion temperature and the formation of NOx. Several techniques have been suggested to diagnose trouble within the EGR system. One such suggested method is in U.S. Pat. No. 5,239,971 entitled "Trouble Diagnosis Device for Exhaust Gas Recirculation System" inventor Uchinami issued Aug. 31, 1993. In such suggested system, a diagnostic device receives the output detected by one of the engine sensors and compares the output with a predetermined value of the same kind as the output a normal state of the EGR system corresponding to the engine condition detected by the sensors. Specifically, one of the sensors detects NOx in exhaust gas or exhaust gas temperature. More particularly, the suggested method diagnoses whether an EGR valve is stuck open or stuck closed. The diagnosis is based on an instantaneous NOx sensor reading compared with a predetermined high or low limit. If the instantaneous difference is greater/less than the limit, a malfunction illumination light (MIL) is triggered.

I have discovered that a more robust method for diagnosing the EGR valve is to process the NOx sensor readings using a statistical model. The use of such a statistical model reduces false indications of a faulty EGR valve. Further, my method enables determination of whether a sticky or loose EGR valve condition exists. Still further, my method enables determination of whether it is the EGR valve that is faulty rather than the NOx sensor being faulty.

In accordance with the invention, a method and system are provided for diagnosing a condition of an EGR valve used in an engine system. The EGR valve controls the portion of exhaust gases fed back to an intake of such engine system. The engine system includes a NOx sensor for measuring NOx in such exhaust. The method includes: determining a time rate of change in NOx measured by the NOx sensor; comparing the determined time rate of change in the measured NOx with a predetermined expected time rate of change in measured NOx; and determining the condition of the EGR valve as a function of such comparison.

In accordance with another feature of the invention, a method and system are provided for diagnosing a condition of an EGR valve used in an engine system. The EGR valve controls the portion of exhaust gases fed back to an intake of such engine system. The engine system includes a NOx sensor for measuring NOx in such exhaust. The method includes: determining from NOx measured by the NOx sensor and engine operating conditions indications of instances when samples of such measured NOx are greater than an expected maximum NOx level for such engine condition and less than an expected minimum NOx level for such engine condition; and determining the condition of the EGR valve as a function of a statistical analysis of such indications.

In accordance with yet another feature of the invention, a method and system are provided for diagnosing a condition of an EGR valve used in an engine system. The EGR valve controls the portion of exhaust gases fed back to an intake of such engine system. The engine system includes a NOx sensor for measuring NOx in such exhaust. The method includes: determining a time rate of change in NOx measured by the NOx sensor; comparing the determined time rate of change in the measured NOx with a predetermined expected time rate of change in measured NOx; and determining from the NOx measured by the NOx sensor and engine operating conditions indications of instances when samples of such measured NOx are greater than an expected maximum NOx level for such engine condition and less than an expected minimum NOx level for such engine condition.

In one embodiment, the method includes determining whether the NOx sensor is faulty and wherein the EGR condition determining includes in such determination the determination as to whether the NOx sensor is faulty.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
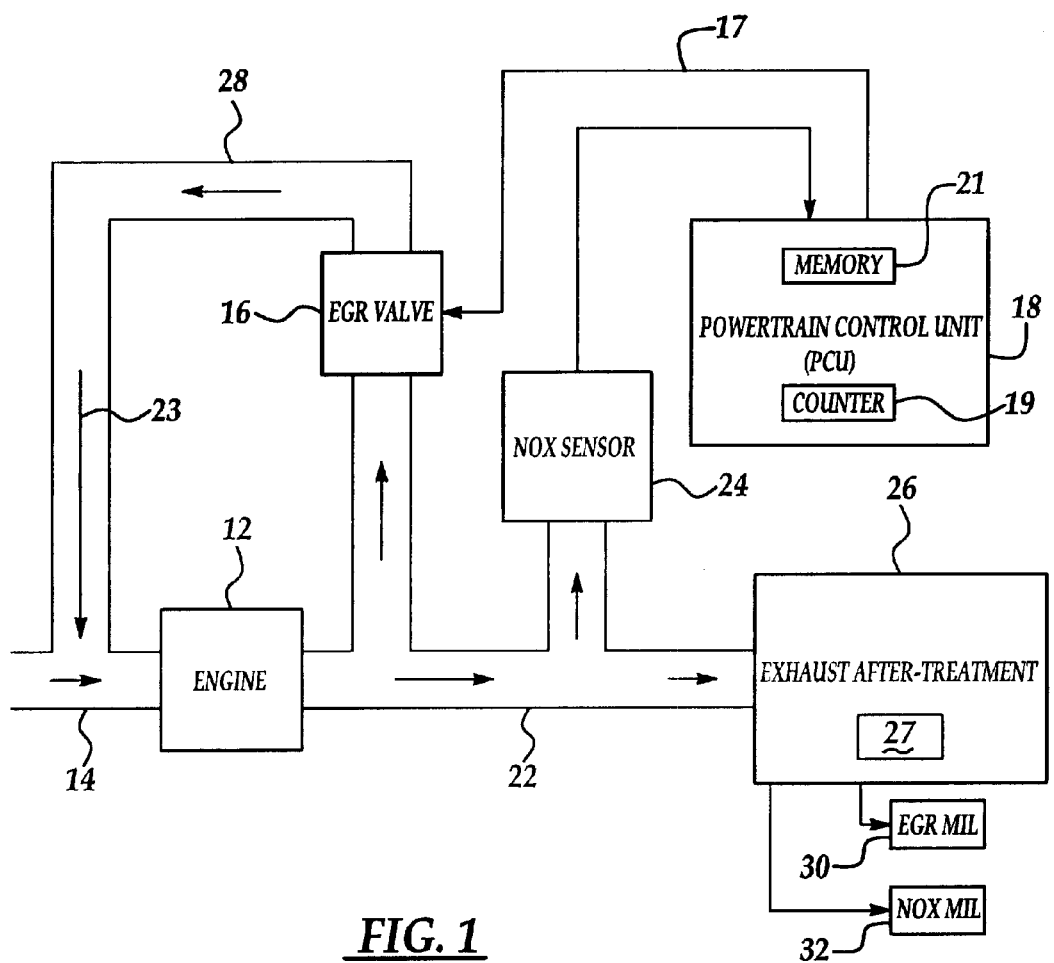
FIG. 1 is block diagram of an engine system 10 according to the invention.

Referring now to FIG. 1, an engine system 10 is shown to include an internal combustion engine 12, here a diesel engine, having an intake manifold 14 for receiving external air and exhaust recirculated gas. More particularly, the engine system 10 includes an EGR valve 16. The EGR valve 16 controls, in response to a control signal on line 17 fed thereby by a controller, here a powertrain control unit (PCU) 18 the portion of exhaust gases in exhaust manifold 22 produced by such engine 12 which are fed back to an intake manifold of such engine 12, as indicated by the arrows 23.

The engine system 10 includes a NOx sensor 24 for measuring NOx in such exhaust gases produced by the engine 12. The exhaust gases are passed to any conventional exhaust after-treatment system 26.

As will be described in more detail hereinafter, the PCU 26 has a storage medium 27 for storing a program (i.e., computer code) to analyze the NOx measured by the NOx sensor 24 and thereby provides a diagnosis of a condition of an EGR valve 16. The method includes: determining a time rate of change in NOx measured by the NOx sensor 24; comparing the determined time rate of change in the measured NOx with a predetermined expected time rate of change in measured NOx; and determining the condition of the EGR valve 16 as a function of such comparison. Also, the PCU 26 is programmed to determine, from NOx measured by the NOx sensor 24 and engine operating conditions indications of instances when samples of such measured NOx are greater than an expected maximum NOx level for such engine condition and less than an expected minimum NOx level for such engine condition. These indications are used to determine the condition of the EGR valve 16 as a function of a statistical analysis of such indications. Still further, the PCU 16 has a storage media 21 for storing a program. The program when executed determines whether the NOx sensor 24 is faulty and whether the EGR valve 16 is faulty.

If the PCU 26 determines that the EGR valve 16 is faulty, but the NOx sensor 24 has not been determined to be faulty, an EGR valve MIL 30 is activated. If the EGR 16 is not determined to be faulty, but the NOx sensor 24 is determined to be faulty, the NOx sensor MIL 32 is activated.

Figure 2:
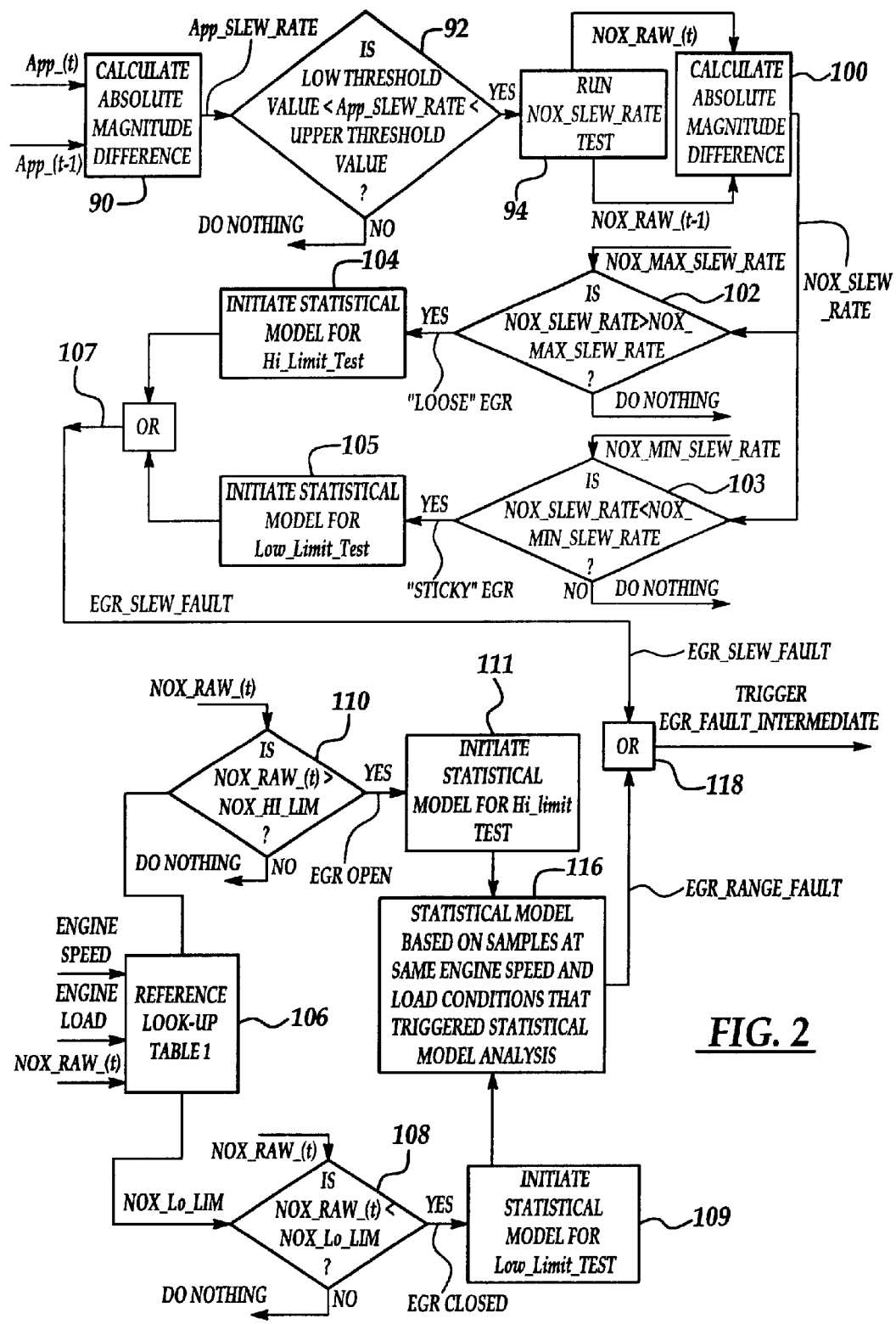
FIG. 2 is a flow diagram of a process performed computer code stored on a computer media in a controller of the system of FIG. 1, such controller when executing such code determining whether a EGR valve in the engine system of FIG. 1 is potentially faulty.

Process for Detection of a "Loose" or "Sticky" EGR Valve:

Referring now to FIG. 2, the method for determining whether the EGR valve 16 is defective (e.g., "loose" or "sticky") will be described.

The processor first determines whether there is an accelerator pedal position (app) change and if so, whether the operator commands a wide-open throttle position. More particularly, in step 90 a change is accelerator position is made between a sample App_(t) at time t and a time of a previous sample at time (t−1) App_(t−1). This difference thereby provides a measure of the rate of change in accelerator position or accelerator position slew (App_SLEW_ RATE). If, in Step 92, App_SLEW_RATE is determined to be greater than a predetermined lower threshold value (LOW THRESHOLD VALUE) and less than a predetermined upper threshold value, then a test is made as to whether the EGR valve is faulty (e.g., sticky or loose). The reason for this test in accelerator position slew is that if the accelerator position does not change from t to (t−1) then the EGR valve position should, in most cases, not change. The difference in readings would then equal 0, which would be less than our NOx_min_slew, and results in an erroneous fault. Another, scenario is if the customer goes from app=0 to app=100% (wide open throttle). Here app_slew would be greater than NOx_max_slew and again result in an erroneous fault.

Figure 5:
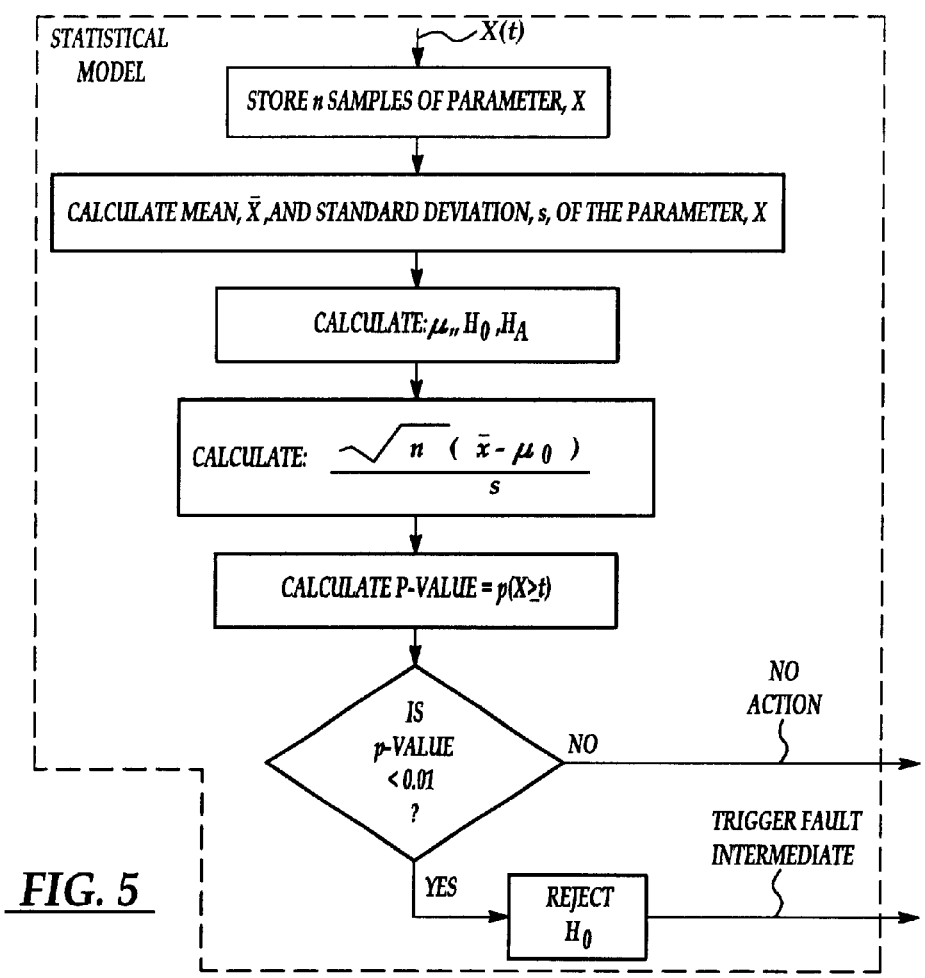
FIG. 5 is a flow diagram of a process performed computer code stored on a computer media in a controller of the system of FIG. 1 to perform a statistical model used by the controller of the engine of FIG. 1 to determine whether an EGR valve in the engine system of FIG. 1 is potentially faulty in accordance with the process in FIG. 3 and whether the NOx sensor in the engine system of FIG. 1 is potentially faulty and whether the EGR valve in the engine system of FIG. 1 is potentially faulty in accordance with the process in FIG. 4.

If the condition described in Step 92 is determined to be "yes", the process proceeds to Step 94 where a NOx_ SLEW_RATE test is performed. More particularly, in Step 100, a comparison, here a difference, is made between a current sample of the measured NOx (i.e., NOx_RAW_(t)) and a previous NOx sample, (i.e., NOx_RAW_(t−1). The difference between NOx_RAW_(t) and NOx_RAW_(t−1) is NOx_SLEW_RATE (i.e., NOx_SLEW_RATE=I NOx_RAW_(t)-NOx_RAW_(t−1) I). NOx_SLEW_ RATE is therefore a measure of the time rate of change in measured NOx. NOx_SLEW_RATE is compared with a predetermined maximum allowed NOx_SLEW_RATE (i.e., NOx_MAX_SLEW_RATE), Step 102. If NOx_ SLEW_RATE is greater than NOx_SLEW_MAX, such event indicates the potentially "loose" EGR valve 16 (FIG. 1) because a properly operating, in this case non-loose EGR valve would not have resulted in such a large time rate of change in NOx (i.e., slew rate). In Step 104, a statistical analysis of these events is performed in order to reject spurious events. (i.e., noise). Here, for example, the statistical analysis, or model, described in connection with FIG. 5, tests the differences for statistical significance. The model is familiar to one in the art and may be described as follows:

A one-sided t-distribution is used. If a standard normal random variable is divided by the square root of an independent random variable, then the resulting random variable is said to have a t-distribution. Thus, the method we use to infer a population mean is referred to as a t-procedure and is used to infer a population mean via hypothesis testing. See for example, Probability and Statistics for Engineers and Scientists, by A. Hayter, published by PWS Publishing Co., Boston, Mass. 1996.

$$\text{Test Statistic: } t = \frac{\sqrt{n}\,(\bar{x} - \mu_0)}{s};\quad X = t_{a-1}$$

p-value=$P(X>=t)$ where X is the variable being tested, here slew rates exceeding NOx_MAX_SLEW_RATE Reject $H_O$ condition: p-value<0.01

With regard to the NOx sensor diagnostic strategy:

Hi_limit_test: $\mu_0$=NOx_Hi_lim or $\mu 0$=NOx_MAX_ SLEW_RATE

Low_limit_test: $\mu_0$=NOx_lo_lim or $\mu_0$=NOx_MIN_ SLEW_RATE n is the number of samples to be taken.

It is a predetermined number that is stored in the PCU (Powertrain Control Unit). Testing is used to determine the value of n. In a production vehicle, n is a set value.

t=test statistic="the equation above"

$H_O$ is the null hypothesis.

A null hypothesis ($H_O$) for a population mean ($\mu$) is a statement which designates possible values for the population mean. It is associated with an alternative hypothesis ($H_A$) which is the "opposite" of the null hypothesis.

For a Hi_limit_test: $H_O{:}\mu_{<=}\mu_0$; $H_A{:}\mu_{>}\mu_0$ For a Low_ limit_test:

$H_O{:}\mu_{>=}\mu_0; H_A{:}\mu_{<}\mu_0$

Example calculation:

(A) $\mu_0$=NO$_x$_Hi_lim=100. The actual required value is a predetermined constant that is stored in a memory in the PCU 18.

(B) Desired confidence=99%. The actual required value is a predetermined constant that is stored in the memory in the PCU 18.

(C) The number of samples=n=50. The actual required value is a predetermined constant that is stored in the memory in the PCU 18. However, it must be greater than 30 unless a smaller sample is known to be normally distributed.

(D) The sample average=$\bar{x}$/=106. The actual value is calculated real-time from the values in the stored samples.

(E) The sample standard deviation=s=16.9. The actual value is calculated real-time from the values in the stored samples. Thus, in this example, the process is:

1. Calculate t:

$$t = \frac{\sqrt{n}\,(\bar{x} - \mu_0)}{s}$$

=/50$^{1/2}$(106 100)/16.9}=2.5

2. Generate p-value: p-value=P(X>=t)=P(X>=2.5)==p-value=0.005

3. Decide to reject or accept Ho: p-value=0.005<0.01== Reject Ho

Such statistical model is here implemented as follows:

A previously set a counter 19 is started to count clock pulses and a high limit test (i.e., Hi_Lim_Test) is initiated. The Hi_Lim_Test is initiated by taking n samples of NOx_SLEW_RATE. The mean and standard deviation of NOx_SLEW_RATE is determined. The processor then determines $\mu_0$, $H_O$, $H_A$ and calculates $$t = \frac{\sqrt{n}\,(\bar{x} - \mu_0)}{s}$$

The process then calculates p-values=p(X≧t).

The process then determines if the p-value is less than a predetermined threshold, here for example, 0.01. If it is, the process rejects $H_O$ and triggers an EGR_SLEW_FAULT condition.

The EGR is also tested to determine whether it is "sticky". NOx_SLEW_RATE is compared with a predetermined minimum allowed NOx_SLEW_RATE (i.e., NOx_MIN_SLEW_RATE), Step 103. If NOx_SLEW_RATE is less than NOx_SLEW_MIN, such event indicates the potentially "STICKY" EGR valve 16 (FIG. 1) because a properly operating, in this case non-STICKY EGR valve would have resulted in such a smaller time rate of change in NOx (i.e., slew rate). In Step 105 a statistical analysis of these events is performed in order to reject spurious events (i.e., noise). Here, for example, the statistical analysis, or model, described in connection with FIG. 5, and in Step 104, tests the differences for statistical significance.

If the statistical model used in Step 104 or the statistical model used in Step 105 indicts either a sticky EGR or a loose EGR, a defective EGR (i.e., EGR_SLEW_FAULT) is indicated in Step 107.

Process for Detecting a Stuck Open/Closed EGR valve:

Referring again to FIG. 2, engine-operating parameters such as engine speed (RPM), engine load, and measured NOx (NOx_RAW (t)) are fed to a Look-Up Table 1 (Step 106). From these inputs, and a prior data stored in the Look-Up Table 1, the Look-Up Table 1 produces an output signal $NO_x$_Hi_LIM if the NOx exceeds a high or maximum limit and an output signal $NO_x$_Lo_LIM if the NOx is less than a low or minimum limit.

In Step 108, if NOx_RAW_(t) is less than the low or minimum limit, NOx_Lo_LIM, a statistical analysis is initiated Step 109). Thus, the analysis is performed (Step 116) in statistical model 116, here using the same analysis as described in connection with FIG. 5 except here X is events where NOx_RAW_(t) is less than the low or minimum limit, NOx_Lo_LIM. As in the case of model 104, model 16 is used to reject spurious readings (i.e., noise).

Likewise, in Step 110 if NOx_RAW_(L) is greater than a high or maximum limit NOx_Hi_LIM, a statistical analysis is initiated (Step 111). Thus, the analysis is performed in statistical model 16 (Step 116), here using the same analysis as described in connection with FIG. 5 except here X represents events where NOx_RAW_(t) is less than the low or minimum limit, NOx_Lo_LIM. As in the case of models 104 and 105, model 116 is used to reject spurious readings (i.e., noise).

It is noted that the analysis is performed on samples of NOx_RAW_(t) at the same engine speed and lad that resulted in either NOx_Lo_LIM being less than a low or minimum limit or NOx_Hi_LIM being greater than a high or maximum limit. If the statistical analysis verifies that there is a fault disregarding any spurious detentions, a trigger EGR_RANGE_FAULT signal is produced in Step 116.

If either an EGR_SLEW_FAULT or EGR_RANGE_FAULT is produced. An "EGR_FAULT_INTERMEDIATE" is triggered (Step 118).

Detection of NOx Sensor Fault

Figure 3:
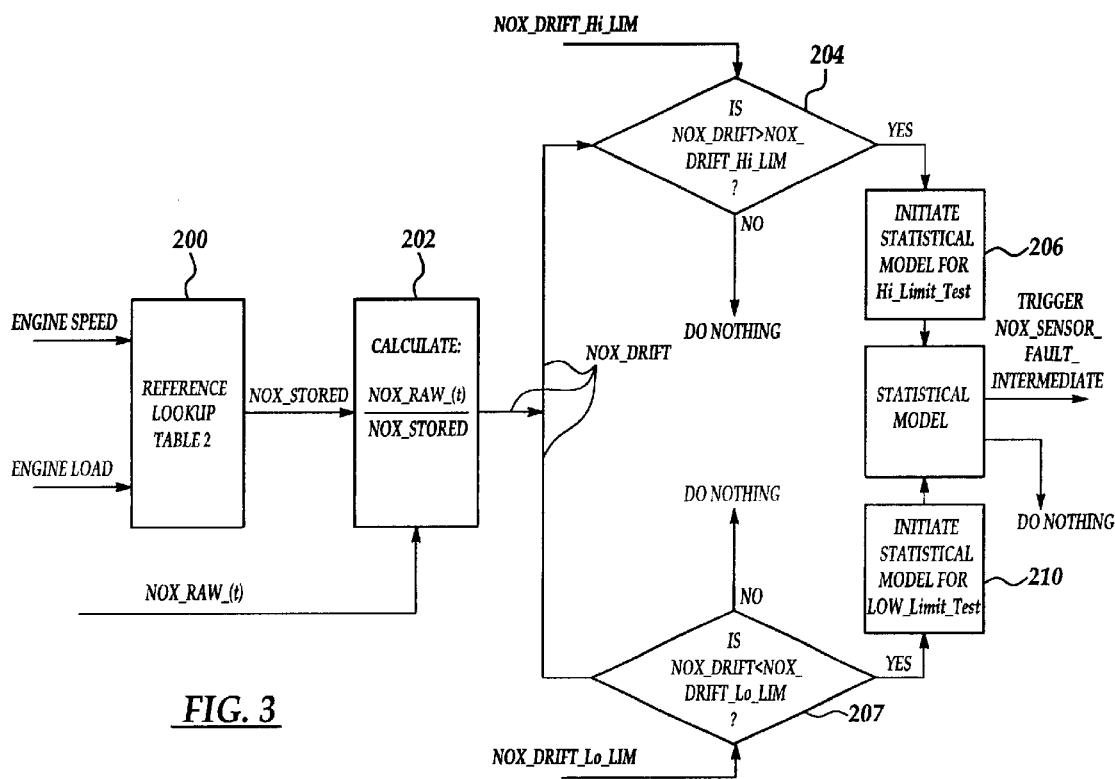
FIG. 3 is a flow diagram of a process performed computer code stored on a computer media in a controller of the system of FIG. 1, such controller when executing such code determining whether a NOx sensor in the engine system of FIG. 1 is potentially faulty.

Referring now to FIG. 3, the process used to detect a NOx sensor fault is described. In Step 200, engine speed and engine load are fed to a second look-up table to determine an expected NOx level, i.e., NOx_STORED. In Step 202, the measured NOx (i.e., NOx_RAW_(t)) is compared with NOx_STORED, here by forming the ratio (NOx_RAW_(t)/NOx_STORED)=NOx_DRIFT. In Step 204, NOx_DRIFT is compared with predetermined maximum NOx drift limit, NOx_DRIFT_HI_LIM. If NOx_DRIFT is greater than NOx_DRIFT_HI_LIM, a statistical analysis is initiated (Step 206) for these events in statistical model in Step 208. Here the statistical analysis is performed on any of these NOx_DRIFT exceeding the limit and the model is the same as that described in connection with FIG. 5 where X is the events these NOx_DRIFT exceeding the limit. If the statistical analysis indicates that there is a valid indication of a faulty NOx sensor, a "NOx_SENSOR_FAULT_INTERMEDIATE" signal is triggered.

In like manner, in Step 206, NOx_DRIFT is compared with predetermined minimum NOx drift limit, NOx_DRIFT_Lo_LIM. If NOx_DRIFT is less than NOx_DRIFT_Lo_LIM, a statistical analysis is initiated (Step 210) for these events in statistical model in Step 208. Here the statistical analysis is performed on any of these NOx_DRIFT less than the limit and the model is the same as that described in connection with FIG. 5 where X is the events these NOx_DRIFT are less than the limit. If the statistical analysis indicates that there is a valid indication of a faulty NOx sensor, a "NOx_SENSOR_FAULT_INTERMEDIATE" signal is triggered.

Malfunction Light Indicator (MIL) Activation.

Figure 4:
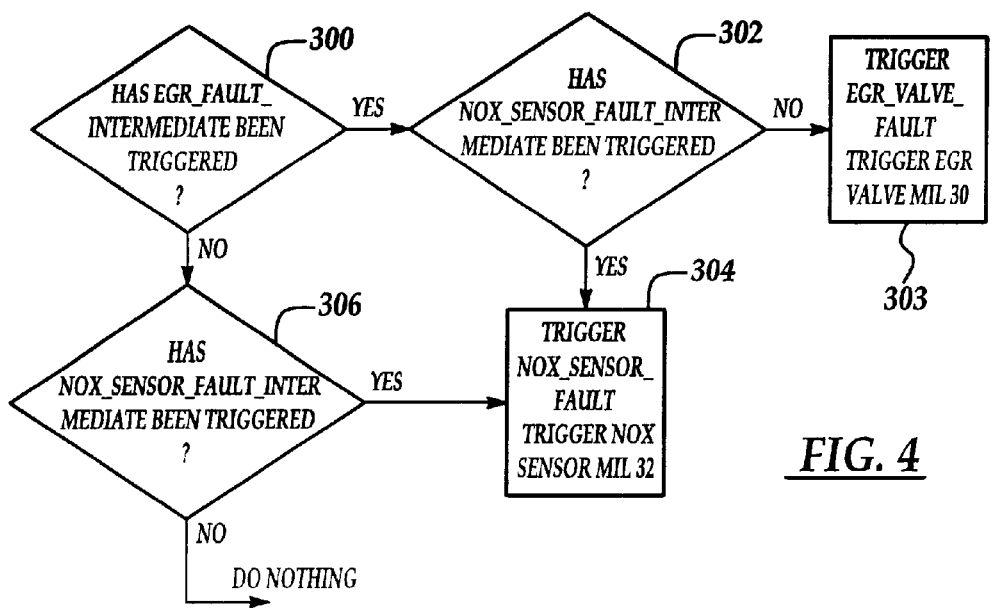
FIG. 4 is a flow diagram of a performed computer code stored on a computer media in a controller of the system of FIG. 1, such controller when executing such code activating an EGR valve fault MIL and/or a NOx sensor MIL in accordance with the invention.

Referring to FIG. 4, if in Step 300, an EGR_FAULT_INTERMEDIATE is triggered and a NOx_SENSOR_INTERMEDIATE signal is triggered (Step 302), the NOx_SENSOR_FAULT MIL 32 (FIG. 1) is activated (Step 304). If, in Step 300, an EGR_FAULT_INTERMEDIATE is triggered but a NOx_SENSOR_INTERMEDIATE signal is not triggered (Step 304), an EGR_VALVE_FAULT MIL 30 (FIG. 1) is activated (Step 303).

If an EGR_FAULT_INTERMEDIATE is not triggered (Step 300) but a NOx_SENSOR_INTERMEDIATE signal is triggered (Step 306), the NOx_SENSOR_FAULT MIL is activated (Step 304).

A number of embodiments of the invention have been described. Nevertheless, it will be understood that various modifications may be made without departing from the spirit and scope of the invention. Accordingly, other embodiments are within the scope of the following claims.

What is claimed is:

1. A method for diagnosing a condition of an EGR valve used in an engine system, such EGR valve controlling a portion of exhaust gases fed back to an intake of such engine system, such engine system including an NOx sensor for measuring NOx in such exhaust, such method comprising:
    determining a time rate of change in NOx measured by the NOx sensor;
    comparing the determined time rate of change in the measured NOx with a predetermined expected time rate of change in measured NOx; and
    determining the condition of the EGR valve as a function of such comparison.

2. The method recited in claim 1 including determining the condition of the EGR valve as a function of a statistical analysis of such comparison.

3. A method for diagnosing a condition of an EGR valve used in an engine system, such EGR valve controlling a portion of exhaust gases fed back to an intake of such engine system, such engine system including an NOx sensor for measuring NOx in such exhaust, such method comprising:
    determining from NOx measured by the NOx sensor and engine operating conditions indications of instances when samples of such measured NOx are greater than an expected maximum NOx level for such engine condition and less than an expected minimum NOx level for such engine condition; and
    determining the condition of the EGR valve as a function of a statistical analysis of such indications.

4. A method for diagnosing a condition of an EGR valve used in an engine system, such EGR valve controlling a portion of exhaust gases fed back to an intake of such engine system, such engine system including an NOx sensor for measuring NOx in such exhaust, such method comprising:
    determining a time rate of change in NOx measured by the NOx sensor;
    comparing the determined time rate of change in the measured NOx with a predetermined expected time rate of change in measured NOx; and
    determining from the NOx measured by the NOx sensor and engine operating conditions indications of instances when samples of such measured NOx are greater than an expected maximum NOx level for such engine condition and less than an expected minimum NOx level for such engine condition.

5. The method recited in claim 4 including determining the condition of the EGR valve as a function of a statistical analysis of such indications.

6. The method recited in claim 5 including determining the condition of the EGR valve as a function of a statistical analysis of such comparison.

7. The method recited in claim 1 including determining whether the NOx sensor is faulty and wherein the EGR condition determining includes determining whether the NOx sensor is faulty.

8. The method recited in claim 3 including determining whether the NOx sensor is faulty and wherein the EGR condition determining includes determining whether the NOx sensor is faulty.

9. The method recited in claim 4 including determining whether the NOx sensor is faulty and wherein the EGR condition determining includes determining whether the NOx sensor is faulty.

10. The method recited in claim 7 including determining whether the NOx sensor is faulty and wherein the EGR condition determining includes determining whether the NOx sensor is faulty.

11. A system for diagnosis a condition of an EGR valve used in an engine system, such engine system comprising:
    a NOx sensor for measuring NOx in exhaust gases from such engine system;
    an EGR valve for controlling a portion of the exhaust gases fed back to an intake of such engine system; and
    a controller for:
        determining a time rate of change in NOx measured by the NOx sensor;
        comparing the determined time rate of change in the measured NOx with a predetermined expected time rate of change in measured NOx; and
        determining the condition of the EGR valve as a function of such comparison.

12. The system recited in claim 11, wherein the controller determines the condition of the EGR valve as a function of a statistical analysis of such comparison.

13. A system for diagnosing a condition of an EGR valve used in an engine system, such engine system comprising:
    a NOx sensor for measuring NOx in exhaust gases from such engine system;
    an EGR valve for controlling a portion the exhaust gases produced by such engine system and fed back to an intake of such engine system; and
    a controller for:
        determining from NOx measured by the NOx sensor and engine operating conditions indications of instances when samples of such measured NOx are greater than an expected maximum NOx level for such engine condition and less than an expected minimum NOx level for such engine condition; and
        determining the condition of the EGR valve as a function of a statistical analysis of such indications.

14. A system for diagnosing a condition of an EGR valve used in an engine system, such engine system comprising:
    a NOx sensor for measuring NOx in exhaust gases from such engine system;
    an EGR valve for controlling a portion the exhaust gases produced by such engine system and fed back to an intake of such engine system; and
    a controller for:
        determining a time rate of change in NOx measured by the NOx sensor;
        comparing the determined time rate of change in the measured NOx with a predetermined expected time rate of change in measured NOx; and
        determining from the NOx measured by the NOx sensor and engine operating conditions indications of instances when samples of such measured NOx are greater than an expected maximum NOx level for such engine condition and less than an expected minimum NOx level for such engine condition.

15. The system recited in claim 14, wherein the controller determines the condition of the EGR valve as a function of a statistical analysis of such indications.

16. The system recited in claim 15, wherein the controller determines the condition of the EGR valve as a function of a statistical analysis of such indications.

17. The system recited in claim 11, wherein the controller determines the condition of the EGR valve as a function of a statistical analysis of such indications.

18. The system recited in claim 13, wherein the controller determines the condition of the EGR valve as a function of a statistical analysis of such indications.

19. The system recited in claim 14, wherein the controller determines the condition of the EGR valve as a function of a statistical analysis of such indications.

20. The system recited in claim 17, wherein the controller determines the condition of the EGR valve as a function of a statistical analysis of such indications.

* * * * *